Feb. 28, 1933. H. G. THUNDER 1,899,367
WINDSHIELD OPERATING MECHANISM
Filed May 4, 1931 2 Sheets-Sheet 1
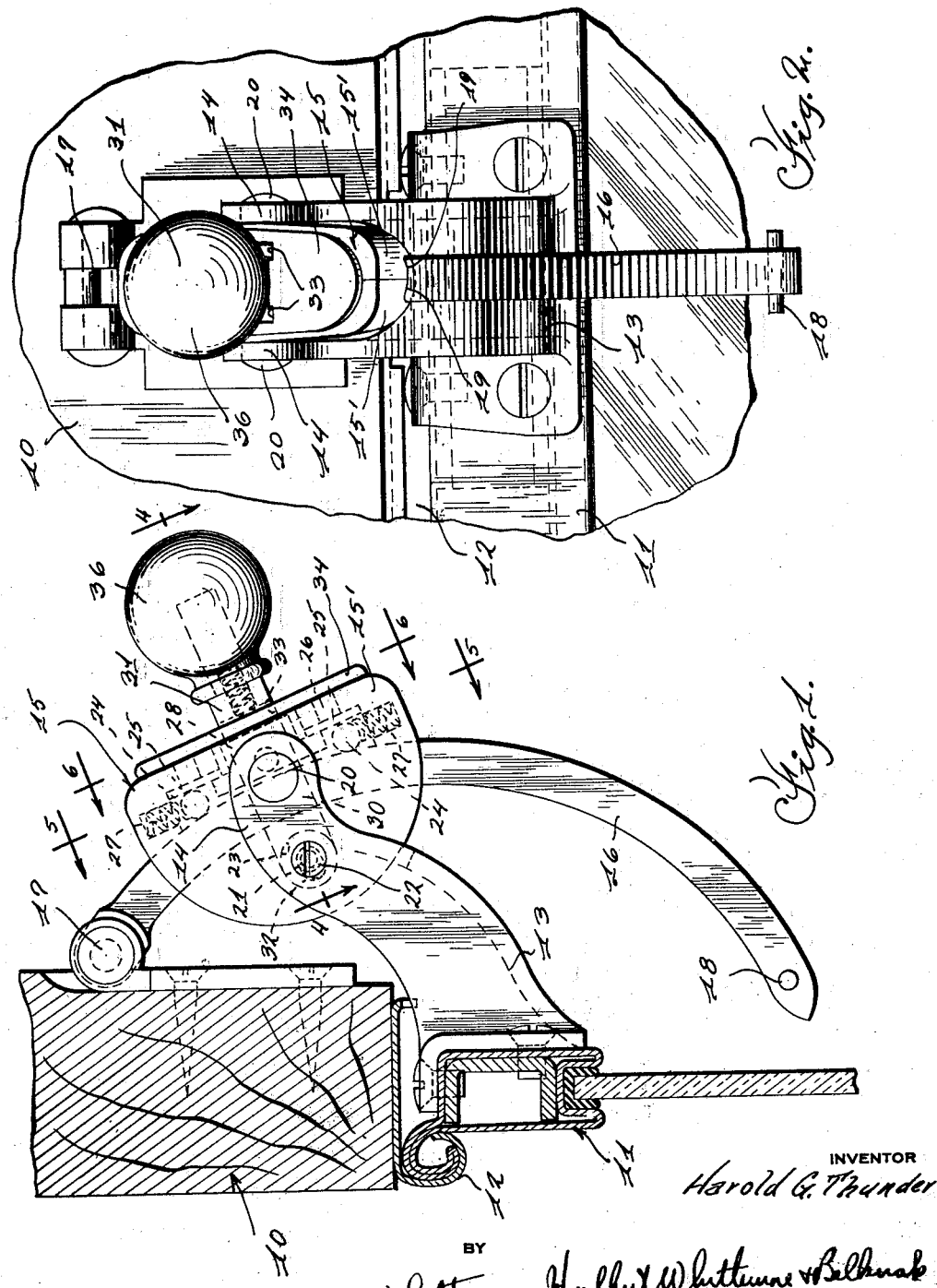
INVENTOR
Harold G. Thunder Feb. 28, 1933.                H. G. THUNDER                1,899,367
                       WINDSHIELD OPERATING MECHANISM
                            Filed May 4, 1931           2 Sheets-Sheet 2
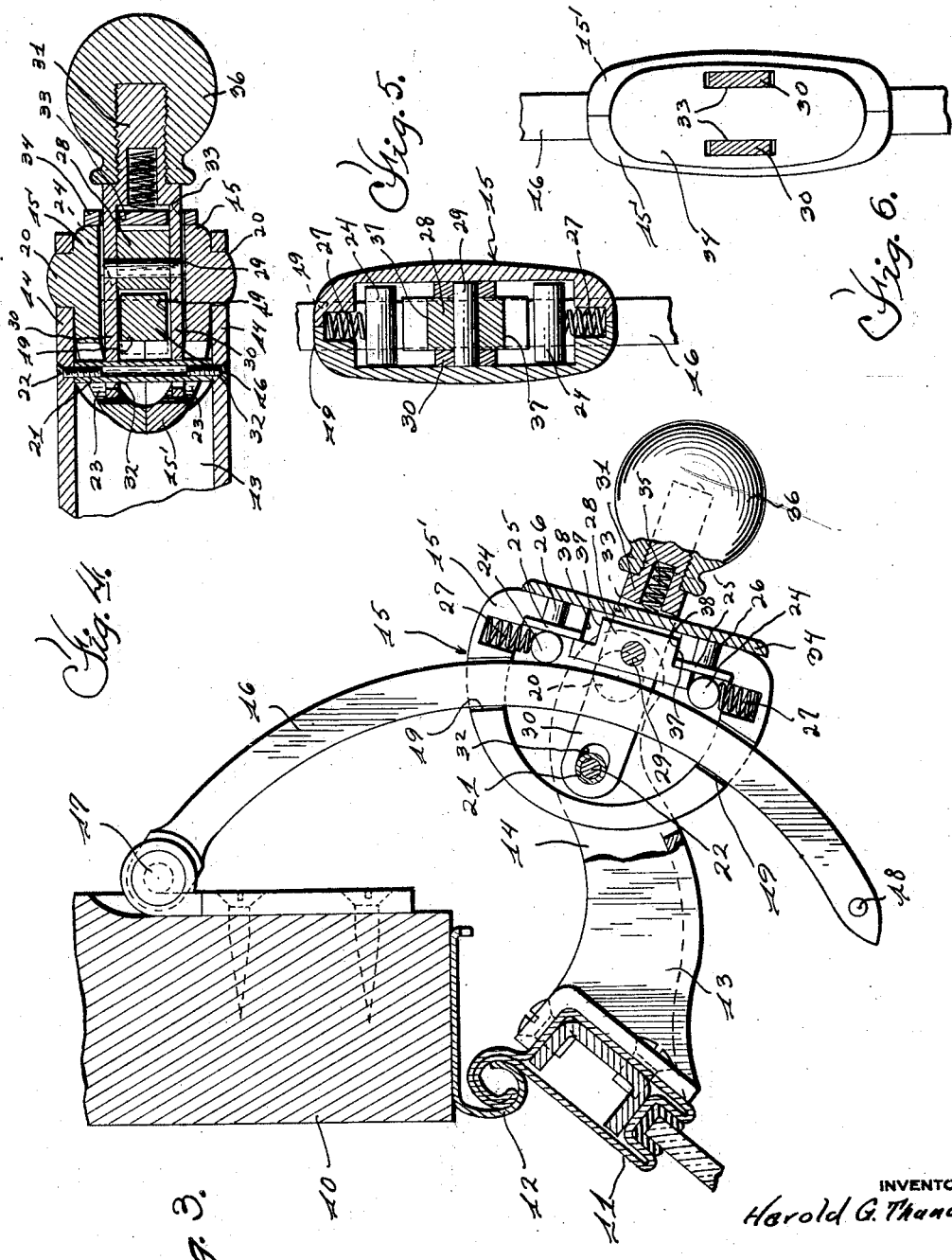
INVENTOR
Harold G. Thunder
BY
ATTORNEYS Patented Feb. 28, 1933

1,899,367

UNITED STATES PATENT OFFICE

HAROLD G. THUNDER, OF DETROIT, MICHIGAN, ASSIGNOR TO MOTOR PRODUCTS CORPORATION, OF DETROIT, MICHIGAN, A CORPORATION OF NEW YORK

WINDSHIELD OPERATING MECHANISM

Application filed May 4, 1931. Serial No. 535,037.

This invention relates to windshield operating mechanism and more particularly to improvements in constructions of this character.

The invention relates more especially to a roller clutch type of windshield operating mechanism wherein the windshield is held in any of its adjusted positions by roller clutch means.

The several objects, advantages and novel details of construction of the invention will be made more apparent as this description proceeds, especially when considered in connection with the accompanying drawings, wherein Figure 1 is a fragmentary sectional elevational view showing a windshield operating mechanism constructed in accordance with my invention;

Figure 2 is a front elevational view of the structure illustrated in Figure 1;

Figure 3 is a vertical sectional view through the operating mechanism;

Figure 4 is a transverse sectional view taken substantially on the plane indicated by line 4—4 in Figure 1;

Figure 5 is a sectional view taken substantially on the plane indicated by line 5—5 in Figure 1, and Figure 6 is a sectional elevational view taken substantially on the plane indicated by line 6—6 in Figure 1.

In the drawings, the reference character 10 indicates a support for the windshield such, for instance, as the motor vehicle header, and 11 indicates the windshield. The windshield is pivotally or hingedly mounted upon the support 10 by means of a hinge 12.

Secured to the frame of the windshield is a lever arm or bracket 13 having a bifurcated end, the furcations being indicated by the reference character 14. The bifurcated end of the lever or bracket 13 straddles a housing indicated generally by the reference character 15. This housing is preferably formed of two half sections and the housing thus formed encloses a roller clutch mechanism adapted to hold the windshield in its adjusted positions. This roller clutch mechanism engages a sector or arcuate shaped member 16 which is secured to the header or support 10 as indicated at 17, the connection between the parts being preferably a pivotal connection as illustrated. The free end of the sector 16 is provided with a projection or stop-pin 18 for a purpose which will appear more fully hereinafter.

Each half section 15' of the housing 15, is provided with a pair of opposed recesses or cut-away portions 19 which together, when the housing sections are assembled, form a passageway through the housing through which the sector 16 may slide.

Each housing section 15 is provided with a trunnion member 20 engaged by one of the furcations 14 of the lever 13.

A sleeve 21 extends transversely through the housing and screws 22 are threaded into the opposite ends of this sleeve member, these screws also respectively, passing through the furcations 14 of the lever 13. The housing 15 is provided with enlarged openings 23 to accommodate this transverse tie member, thereby providing clearance around the sleeve 21 so as to permit of a limited pivotal movement of the housing on its trunnions 20. This will permit the parts to accommodate themselves to manufacturing inaccuracies as will be obvious.

Arranged within the housing 15 is a pair of clutch rollers 24 which engage the adjacent face of the sector 16 to hold the windshield in its adjusted positions. These rollers engage contact or bearing blocks 25 secured within the housing by engaging suitably formed recesses therein, these blocks being preferably located by means of studs 26 which engage in recesses formed in the housing parts for the purpose of receiving the same. Each clutch roller 24 is normally urged in one direction, that is, its clutching direction, by means of a coil spring 27.

The clutch rollers 24 are adapted to be selectively disengaged by means of a shiftable block-like member 28 rockably mounted on a pin 29 which extends between the arms 30 of a lever 31. The free ends of the arms 30 of the lever 31 are each provided with an elongated slot 32 to receive the sleeve 21 heretofore referred to. This pivotally mounts the lever 31 within the housing for shifting movement about the sleeve 21 as a center. The arms 30 of the lever 31 extend through slots 33 in a plate member 34 which plate member closes the opening of the housing 15 and acts as a finish member therefor. The plate 34 is normally held in engagement with the housing and the lever 31 is held in its extended position by means of a coil spring 35 arranged in a recess in the lever 31 and engaging the plate 34. A knob or handle 36 is carried by the lever 31 to be grasped by the operator in actuating the device.

The disengaging block or clutch roller actuating member 28 is formed with a pair of opposed shoulders 37 which in the two extreme positions of the lever 31 engage cooperating shoulders 38 formed on the housing.

The manner of operating the device is as follows. By moving the lever 31 in either direction, one of the clutch rollers 24 is first moved against the action of its corresponding spring 27 so as to release it from its clutching action and thereafter the adjacent shoulder 37 engages the corresponding shoulder 38 on the housing whereupon the housing and consequently the lever 13 and with it the windshield 11 are moved in the direction in which the lever 31 is being moved. During this movement the other clutch roller moves out of clutching position automatically. When the handle 31 is brought to rest, the spring 27 acts to move the clutch rollers into clutching engagement with the adjacent face of the sector and the corresponding wear plates and the windshield is held in this position until the lever 31 is again operated. Obviously in moving the windshield from an open position to a closed position, the uppermost clutch roller 24 is disengaged and in moving the windshield from the closed position to an open position the other clutch roller is positively disengaged by the movement of the block 28.

The herein described construction provides a simple and efficient means for operating the windshield and securing the same in any of its adjusted positions. Various small movements of the windshield may be made and immediately that handle 31 is released the clutch rollers automatically assume their clutching positions and rigidly hold the windshield against accidental displacement.

The structure may be economically produced, may be assembled with facility and presents a neat, compact and unobjectionable appearance.

What I claim as my invention is:

1. A windshield operating mechanism comprising, a windshield, a support upon which the windshield is pivotally mounted, a housing member carried by the windshield, a pair of opposed roller clutch members mounted in said housing, a member carried by said support and extending through said housing for engagement with said roller clutch members to hold the windshield in its adjusted positions, and an operating member carried by said housing and operable to selectively disengage said roller clutch members and to move said windshield to adjusted positions.

2. A windshield operating mechanism comprising, a windshield, a support upon which the windshield is pivotally mounted, a housing member carried by the windshield, a sector member carried by the support and extending through said housing member, a pair of opposed roller clutch members arranged within said housing and engageable with said sector member, means normally urging said roller clutch members into clutching position, a handle pivotally associated with said housing member, and means carried by said handle adapted to disengage said roller clutch members and to swing the windshield about its pivot.

3. A windshield operating mechanism comprising, a windshield, a support upon which the windshield is pivotally mounted, a housing member carried by the windshield, a sector member carried by the support and extending through said housing member, a pair of opposed roller clutch members arranged within said housing and engageable with said sector member, means normally urging said roller clutch members into clutching position, a handle pivotally associated with said housing member, and means actuated upon movement of said handle for first disengaging one of said roller clutch members and then engaging said housing member to swing said windshield about its pivot.

4. In a windshield operating mechanism, a windshield, a support upon which the windshield is pivotally mounted, a roller clutch mechanism including a pair of clutch rollers operating respectively for holding the windshield against movement in opposite directions, a windshield operating handle, and means operable by said handle for disengaging either of said clutch rollers and for moving said windshield to adjusted positions.

5. In a windshield operating mechanism, a windshield, a support upon which the windshield is pivotally mounted, a roller clutch mechanism including a pair of clutch rollers operating respectively for holding the windshield against movement in opposite directions, means normally urging said clutch rollers into clutching position, a windshield operating handle, and means operable by said handle for first disengaging either of said clutch rollers and subsequently moving said windshield about its pivotal support.

In testimony whereof I affix my signature.

HAROLD G. THUNDER.